US005850686A

United States Patent [19]

Mertes

[11] Patent Number: 5,850,686

[45] Date of Patent: Dec. 22, 1998

[54] APPARATUS FOR MAKING WALL FRAME STRUCTURES

[75] Inventor: Michael M. Mertes, Beaverton, Oreg.

[73] Assignee: Gary J. Haberman, Beaverton, Oreg.

[21] Appl. No.: 591,937

[22] Filed: Jan. 25, 1996

[51] Int. Cl.[6] .......... B23P 11/00

[52] U.S. Cl. .......... 29/809; 29/897.312; 29/822; 29/784; 29/788; 29/281.1

[58] Field of Search .......... 29/897.3, 897.312, 29/809, 822, 784, 787, 788, 281.1, 281.3; 269/297, 289 R, 910

[56] References Cited

U.S. PATENT DOCUMENTS

| | | | |
|---|---|---|---|
| 2,626,643 | 1/1953 | Kantzler | 144/288 |
| 3,119,173 | 1/1964 | Glaser | 29/281.3 |
| 3,131,737 | 5/1964 | Pearl | 29/281.3 |
| 3,507,024 | 4/1970 | Powers et al. | 29/897.3 |
| 3,681,842 | 8/1972 | Blakeslee | 29/809 |
| 3,699,622 | 10/1972 | Frydenberg | 29/155 |
| 3,945,630 | 3/1976 | Brunemann | 269/321 |
| 3,961,407 | 6/1976 | Falkenberg | 29/281.3 |
| 4,629,171 | 12/1986 | Judy et al. | 269/37 |
| 4,824,004 | 4/1989 | Hanson | 29/281.3 |
| 5,507,091 | 4/1996 | Bullen | 29/809 |

*Primary Examiner*—Larry I. Schwartz
*Assistant Examiner*—Marc W. Butler
*Attorney, Agent, or Firm*—Olson and Olson

[57] ABSTRACT

An apparatus for the high-volume manufacture of assembled wall frame structures for use in the residential and commercial building industry is arranged to receive and support a pair of laterally spaced apart top and bottom plate members and move them longitudinally in indexed, stepwise increments through a stud-inserting and fastening station in which wall stud members are automatically positioned to engage and extend perpendicularly between the plate members at predetermined intervals therealong, whereupon the opposite ends of a stud member are secured to the opposite plate members by a fastening device, whereby complete wall frame assemblies may be quickly and efficiently made on a continuous basis according to desired specification as ordered and thence delivered to a construction site for erection.

11 Claims, 9 Drawing Sheets

FIG. 8
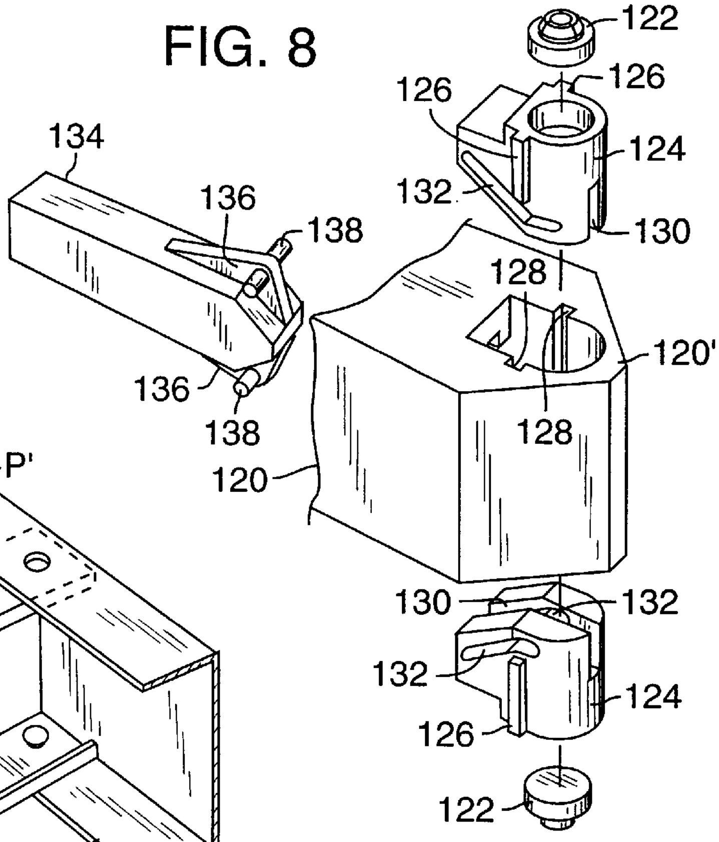
FIG. 10
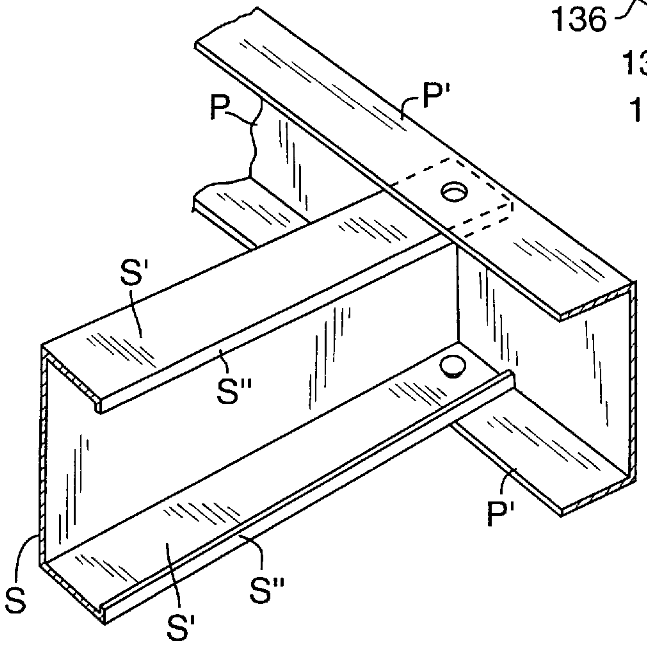
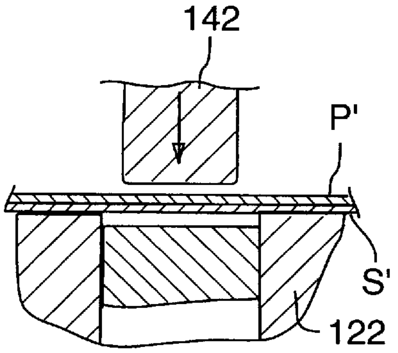
FIG. 11A
FIG. 11B
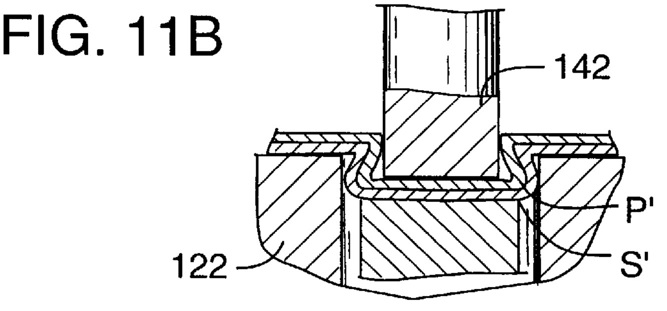

APPARATUS FOR MAKING WALL FRAME STRUCTURES

BACKGROUND OF THE INVENTION

This invention relates generally to the construction of wall frame structures such as those used in residential and commercial buildings, and more specifically to a method and apparatus for the manufacture of wall frame structures on or for delivery to a building site where the assembled wall framing may be quickly and simply erected, and thereby significantly reduce the on-site framing time and labor required by a framing crew.

As is well known, the construction of buildings, whether residential or commercial, is and always has been extremely labor-intensive. Whether a structure is fully "site-built" or is merely "site-assembled" using pre-fab or pre-manufactured wall sections, roof trusses, and other such prefabricated components which are constructed elsewhere and delivered to the site for assembly, the actual construction of the building wall framing heretofore has involved a manual, hand operation that has changed little throughout the history of "stud wall" building construction. Indeed, whether wall framing comprises wood or metal members, their assembly heretofore has invariably involved the labor intensive, highly repetitive initial operation of fastening studs to top and bottom plate members at regularly spaced intervals by hand. In fact, the majority of a framing crew's on-site time, and therefore corresponding cost, is primarily involved in the simple assembly of the wall framing before it can be erected into its intended position. Quite clearly, eliminating this time-consuming initial hand assembly requirement would necessarily effect a reduction in labor costs, whether wall frames are assembled on or off site, and would result in a more efficient use of framing crew's on-site time and skills. This would not only reduce the ultimate cost to the homeowner, but would also permit framing crews to take on and complete a greater number of framing jobs in a given period of time.

SUMMARY OF THE INVENTION

In its basic concept this invention provides a method and apparatus for the efficient and automated volume production of assembled wall frame structures for use by the building industry.

It is by virtue of the foregoing basic concept that the principal object of this invention is achieved; namely, to eliminate the heretofore necessary time, labor and corresponding costs involved in the hand assembly of wall framing prior to its installation, whereby to reduce the on-site time required for the framing of a building and thereby reduce the overall construction costs of framing while also increasing the efficiency and productivity of on-site framing crews.

Another object of this invention is the provision of an apparatus for making wall frame structures of the class described which may be adapted for use with any conventional wall framing material such as wood or metal plates and studs.

Another object of this invention is the provision of an apparatus for making wall frame structures of the class described which may be adapted for use with various dimensions and configurations of framing materials as may be desired for the construction of wall frame structures of desired height, length, thickness, stud spacing, etc. to accommodate virtually any wall specification.

Another object of this invention is the provision of an apparatus for making wall frame structures of the class described which may be fully automated and computer operated, requiring only a single individual to instruct and oversee the computer for the high volume, continuous production of wall frame units built according to individual specifications ordered by a customer.

A further object of this invention is the provision of an apparatus for making wall frame structures of the class described which may utilize virtually any type of fastener and fastening apparatus that is suitable with the plate and stud member material being used, for example, an apparatus for driving nails or screws in conjunction with wood or metal frame members, and an apparatus for riveting or welding studs and plates to each other in conjunction with metal framing members.

The foregoing and other objects and advantages of this invention will appear from the following detailed description, taken in connection with the accompanying drawings of the preferred embodiment.

BRIEF DESCRIPTION OF THE DRAWINGS

FIG. 8 is a fragmentary, exploded perspective view of a portion of a preferred embodiment of a fastening apparatus configured to secure C-shaped metal stud members to channel-shaped metal plate members.

FIG. 10 is a fragmentary perspective view of one end of a metal, C-shaped stud member having been fastened to a channel-shaped metal plate member by the wall frame making apparatus of this invention.

FIGS. 11A and 11B are sectional views showing the fastening connection that is formed by the fastening apparatus illustrated in FIGS. 8–9F in the securing of metal stud and plate members together as seen in FIG. 10.

DESCRIPTION OF THE PREFERRED EMBODIMENT

Figure 1:
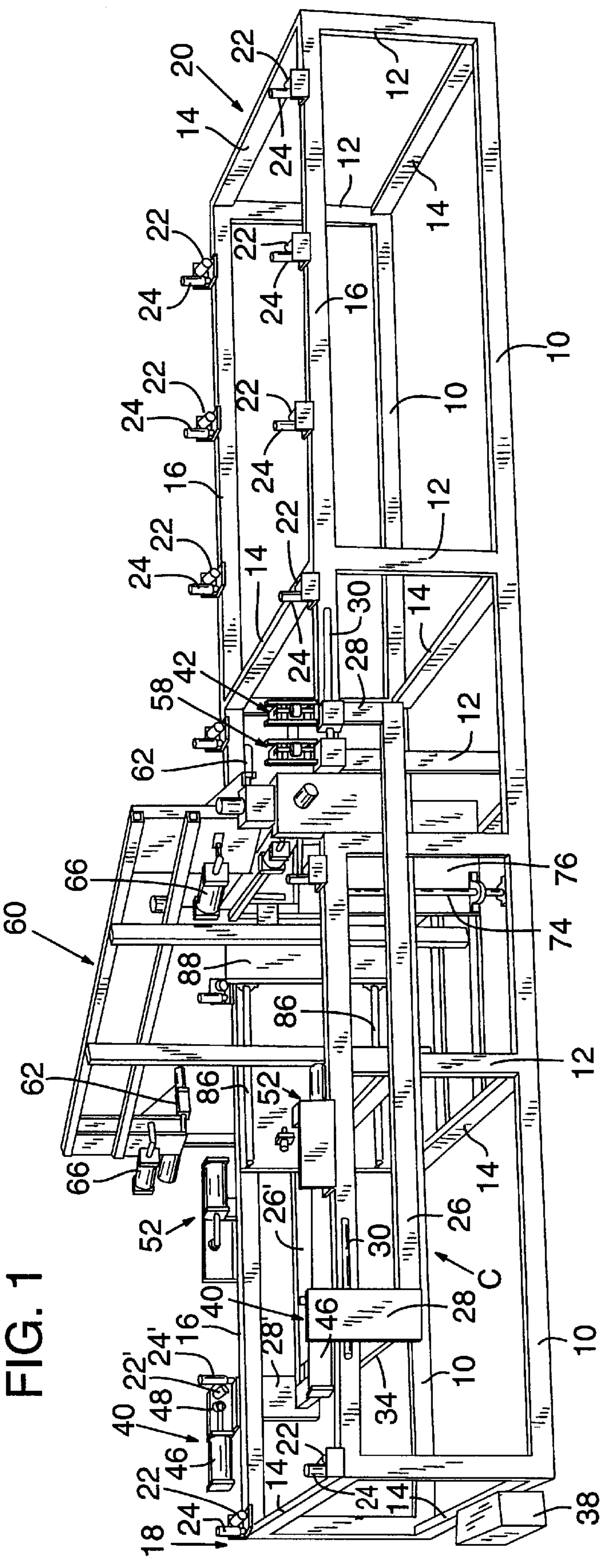
FIG. 1 is a schematic perspective view of a wall frame making apparatus embodying features of this invention.

This invention provides a unique method for the high-volume construction of wall frame structures of desired dimensions, along with an apparatus arranged to construct wall frame structures of desired dimension in high volumes without requiring any hand labor whatsoever in their assembly. With reference to the apparatus, a preferred embodiment of a wall frame making apparatus is illustrated in the drawings, this embodiment of the invention configured for the production of metal framework wall structures comprising substantially channel-shaped bottom plate members (otherwise known in the art as sole plates) and top plate members, collectively referenced herein as P, and substantially C-shaped metal stud members S, all formed from desired gauge sheet metal as is well understood in the industry, and best illustrated in FIG. 10 of the drawings.

Figure 2:
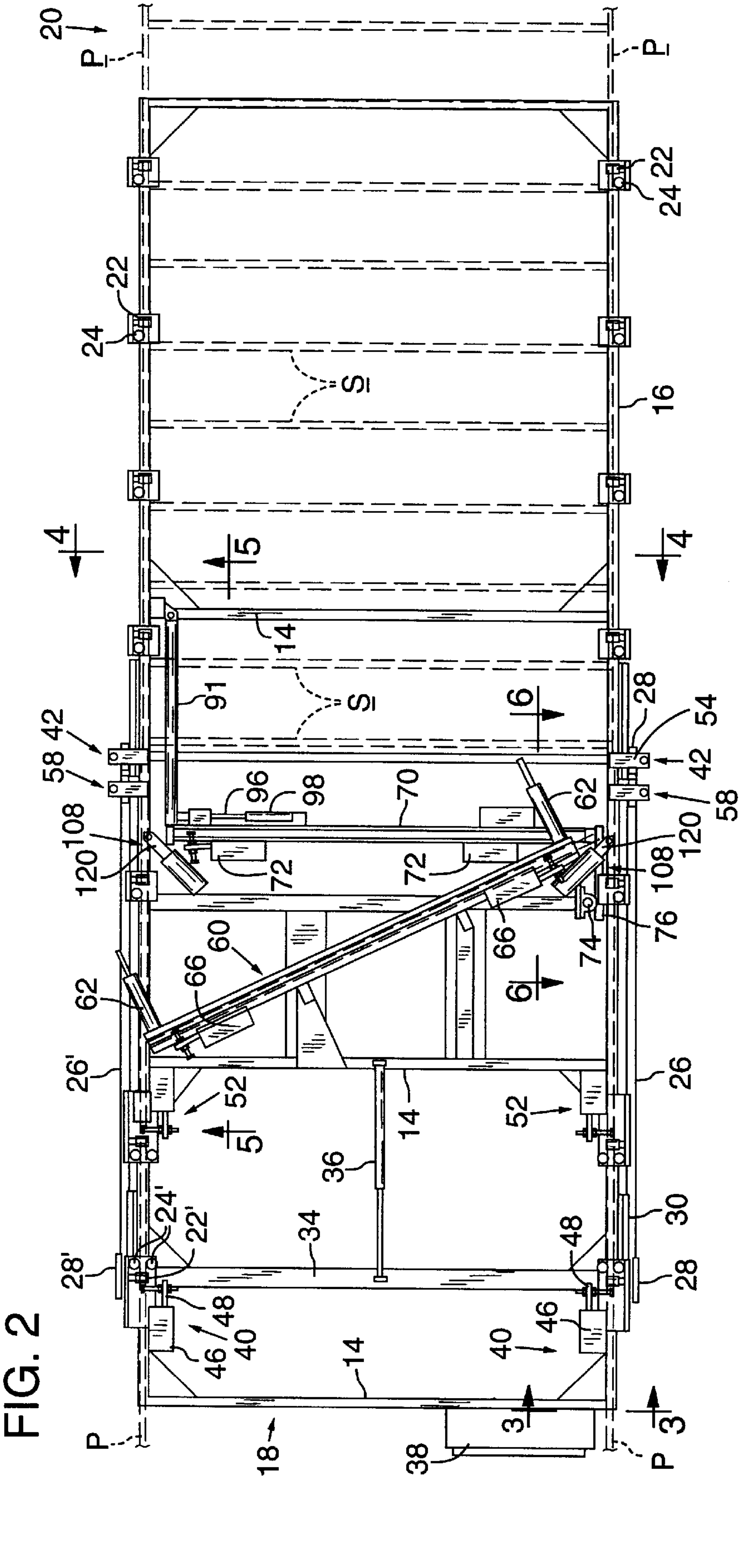
FIG. 2 is a plan view of the wall frame making apparatus of FIG. 1 as viewed from the top in FIG. 1.

With reference first primarily to FIGS. 1 and 2 of the drawings, the embodiment of the wall making apparatus illustrated therein comprises a longitudinally elongated framework which includes a base 10 mounting upright members 12 and cross members 14 which support frame top rails 16. The longitudinal ends of the clamped frame thus described define the infeed end 18 and outfeed end 20 of the apparatus, as will become apparent.

Means is provided to support the opposite top and bottom plate members P in a desired, laterally spaced apart condition for longitudinal, indexed movement on the frame from the infeed end 18 to the outfeed end 20. In the embodiment illustrated, this is provided by a plurality of guide assemblies mounted along the frame top rails 16, the guide assemblies each mounting a horizontally-disposed, plate member support roller 22 and a pair of spaced-apart, vertically-disposed, guide rollers 24 arranged to confine a plate member edgewise therebetween, to maintain the opposite plate members in a precise, predetermined spaced apart condition with their projecting flanges P' facing toward each other as the plates are moved along the length of the frame.

Means is provided to releasably engage plate members P supported by the frame and move them stepwise in the outfeed direction of the frame. In the embodiment illustrated, this is provided by a reciprocating plate member carriage C mounted for longitudinal movement on the frame, and carriage drive means is provided to engage the frame and the carriage for reciprocating the carriage longitudinally on the frame. As illustrated, the plates carriage comprises a pair of opposite, elongated frame rails 26, 26' having vertically extending end upright members 28, 28' which are supported on opposite top rails 16 of the apparatus frame by longitudinally elongated carriage support tracks 30 and slide bearing mounting members 32.

The opposite sides of the carriage thus formed are joined together by a cross member 34, and carriage drive means, illustrated in FIG. 2 as hydraulic piston cylinder 36 mounted at one end on the apparatus frame member 14 and at the other end on the carriage cross member 34 to move the carriage longitudinally on its supporting tracks 30. The operation of the hydraulic cylinder 36 is standard and well known, and may be controlled independently by an operator or alternatively, fully automatically in conjunction with the operation of the entire apparatus by a computer 38 as will be explained later.

As seen best in FIGS. 1–4, the end upright members 28, 28' of the carriage mount clamp means configured to frictionally engage a pair of opposite plate members and releasably secure them to the carriage while the latter is moved in the outfeed direction of the frame and to release the plate members from engagement with the carriage when the carriage is moved in the reverse direction. Thus, continued reciprocal operation of the carriage effectively indexes the opposite plate members from the infeed end 18 of the apparatus to the outfeed end 20 of the apparatus frame in consistent, predetermined distance increments, as will be explained. Two different types of such plate-engaging clamp assemblies, illustrated generally as 40 and 42, are shown in the drawings, although it is to be understood that other suitable types of releasable clamping arrangements may alternatively be utilized.

Figure 3:
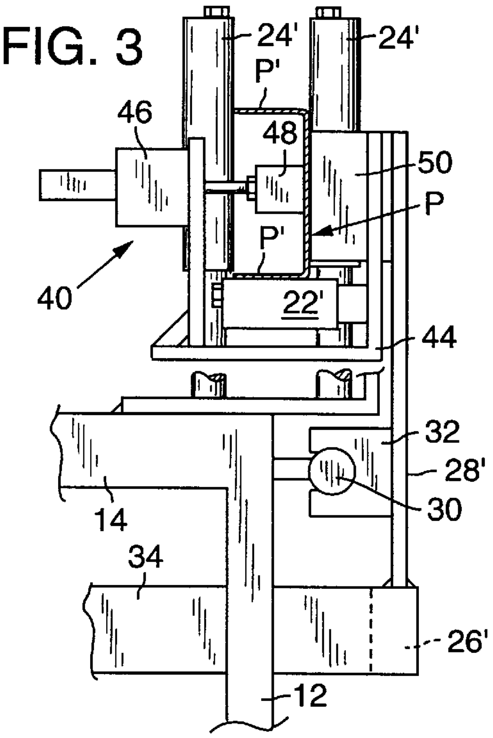
FIG. 3 is a fragmentary sectional view of the plate carriage clamp assembly taken along the line 3—3 in FIG. 2.

With reference first to the clamping assembly 40 associated with the infeed end of the plate carriage, FIG. 3 illustrates that the carriage end uprights 28, 28' mount a support bracket 44 which in turn mounts rollers 22', 24' to support and guide a plate member P in the same manner as the previously described frame-mounted rollers 22, 24. The clamping assembly 40 is also mounted on the bracket 44 and comprises a hydraulic, pneumatic or electric drive unit 46 which moves a clamp plunger 48 into and out of frictional, abutting contact with a plate member, as shown. A backing block 50 may be provided as shown to support the opposite side surface of the plate member when the plunger is operated to press against the inner surface of the plate member between its projecting flanges P' and releasably securing it to the carriage for movement therewith.

As also seen in FIGS. 1 and 2, a pair of cooperating, stationary, infeed clamping assemblies 52, similar to the just-described clamp assemblies 40 mounted on the carriage, are mounted in fixed positions on the opposite top rails 16 of the frame. In operation, these clamping assemblies 52 are activated to frictionally grip and secure the plate members in place during retraction of the carriage toward the infeed end of the apparatus when the carriage clamp assemblies 40 have released engagement with the plate members. These clamp assemblies 52 then release when the carriage clamp assemblies 40 again engage the plate members, to again move the plate members with the carriage in the outfeed direction of the frame.

Figure 4A:
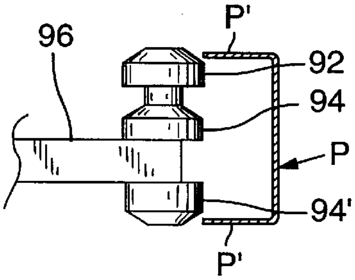
FIG. 4*a* is a fragmentary vertical elevation, on an enlarged scale for clarity, of the plate spreader assembly shown at the right in FIG. 4.
Figure 4:
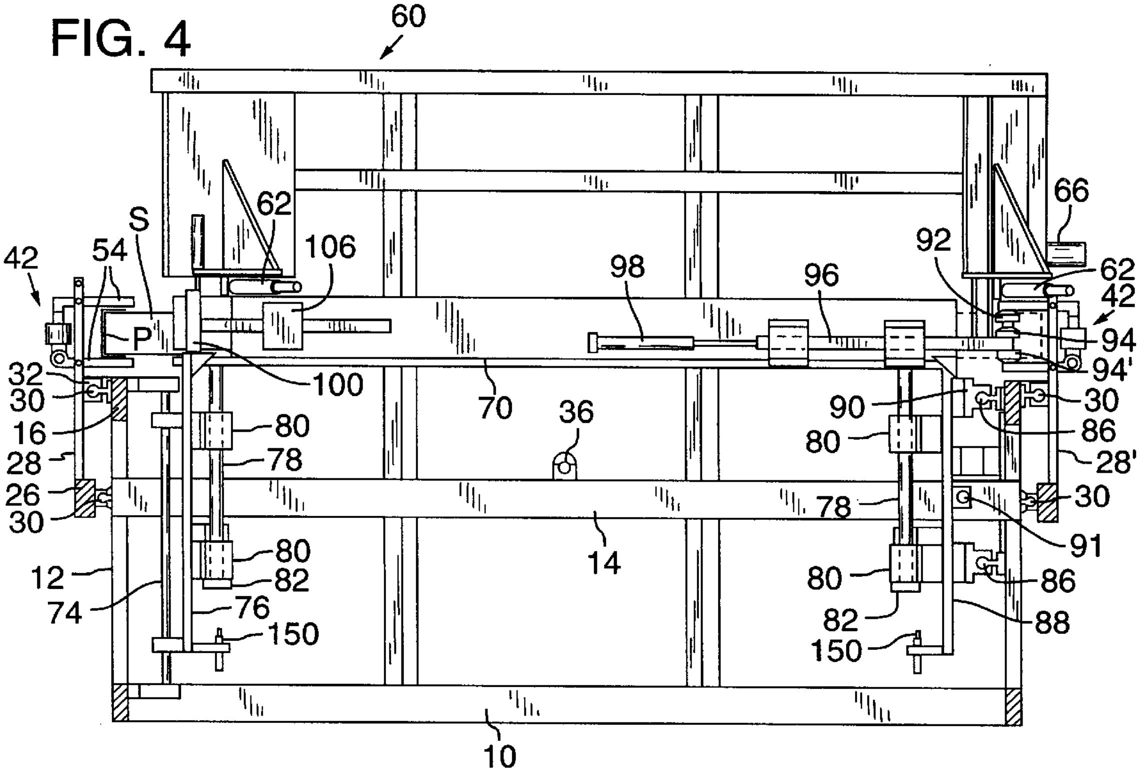
FIG. 4 is a vertical elevation taken through the wall making apparatus along the line 4–4 in FIG. 2, the view facing the infeed end of the apparatus and showing the stud magazine and the stud carriage assembly.

Referring now to the clamping assemblies 42 mounted on opposite sides of the outfeed end of the carriage C, FIGS. 1, 2 and 4 illustrate that a pair of opposing clamp jaws 54 are connected to a hydraulic, pneumatic or electric drive unit 56, and are configured to releasably clamp between them a plate member, as seen best in FIG. 4 of the drawings. Thus engaged, a plate member is firmly secured to the opposite ends of the carriage for movement therewith in the outfeed direction of the frame. Corresponding, frame-mounted clamp assemblies 58 operate in conjunction with the previously described frame-mounted clamp assemblies 52 to secure the plate members against movement during retraction of the carriage in its infeed direction of travel as has been previously explained.

With the foregoing structural elements of the wall making apparatus of this invention thus described, it should be readily apparent that a pair of opposite plate members P enter the infeed end 18 of the apparatus and are supported for movement in uniform, laterally spaced apart condition longitudinally toward the outfeed end of the frame. The cooperation of the carriage-mounted clamping assemblies and the stationary, frame-mounted clamping assemblies during reciprocating movement of the carriage assures that the plate members are indexed toward the outfeed end of the apparatus uniformly and in precise, preselected increments. It will be understood that the travel of the carriage, and hence the indexing of the plate members corresponds to the desired stud spacing, typically either 16 inches on centers or 24 inches on centers, as is well known in the construction industry.

The opposite plate members may be introduced into the infeed end of the apparatus by any suitable means or apparatus including, if desired, manually by unskilled labor to benefit the employment industry. Preferably however, the entire process could be entirely automated, and in that regard, each side of the infeed end of the wall making apparatus would be provided with a simple sheet metal bending apparatus which could form desired plate member configurations using standard sheet metal stock. In this manner, wall sections of virtually any desired length could be produced in unbroken sections, limited in length only by whatever restrictions may be involved imposed in the transporting of completed wall sections to a construction site.

The wall making apparatus of this invention includes means for delivering a wall stud member S to a stud carriage apparatus which will be described later. In the particular embodiment illustrated, a stud magazine 60 is mounted on the frame of the apparatus and configured to hold a plurality of longitudinally elongated wall studs in a horizontally-disposed, vertically stacked condition, as seen best in FIG. 6 of the drawings. For reasons which will become clear, the magazine extends laterally across the frame of the apparatus and preferably, as seen in FIGS. 1 and 2, at an oblique angle relative to the longitudinally extending top rails 16 of the frame and hence the opposite, laterally spaced plate members P supported thereon.

Figure 6:
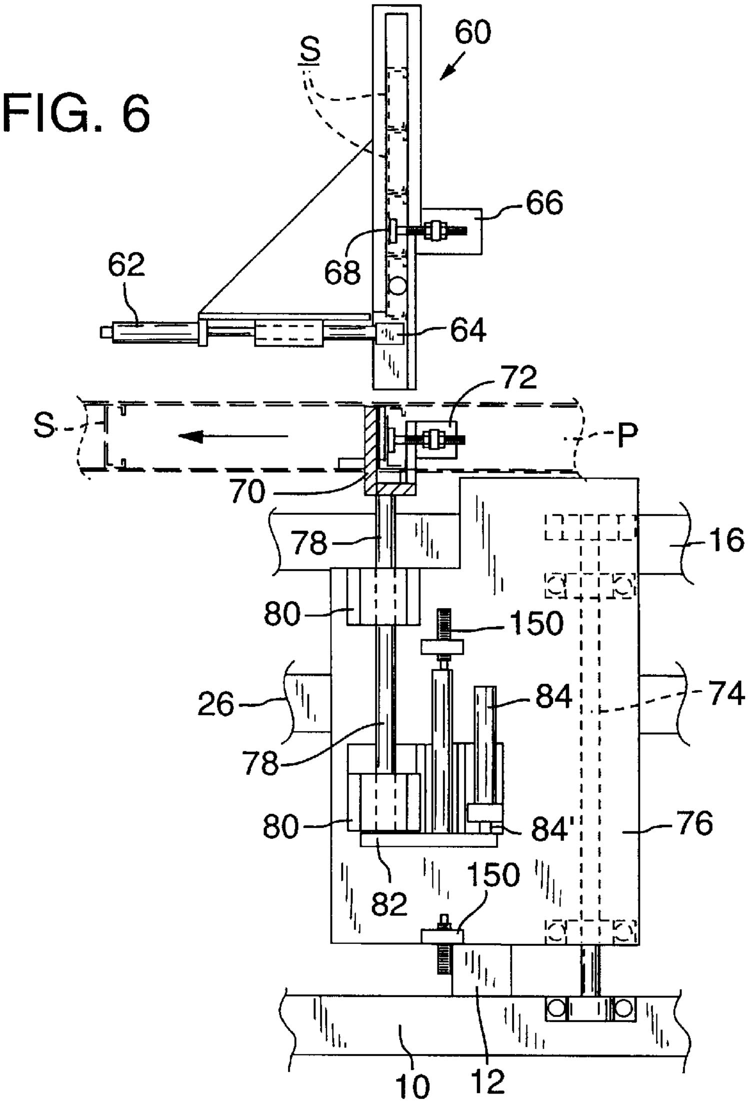
FIG. 6 is a fragmentary side elevation of the wall making apparatus taken along the line 6—6 in FIGS. 2 and 4.

The stud magazine includes support means for releasably supporting the bottommost stud member of the stack of studs being held, and stop means for releasably securing the next-to-bottom stud supporting the remainder of the stack of studs in the magazine. As seen in FIGS. 2 and 6, the support means is provided in this embodiment by a hydraulic, pneumatic, or electric cylinder 62 that operates to move a stop member 64 selectively into and out of position intercepting the bottom opening on each side of the magazine. In the intercepting position shown in FIG. 6, the bottommost stud member rests on and is supported by the stop members 64. When cylinders 62 are activated to withdraw the stop members, the bottommost stud is released from the bottom of the magazine.

The stop means releasably securing the next-to-bottom stud, and the remaining stack of studs, is provided by similar hydraulic, pneumatic or electric cylinders 66 operating stop members 68 configured to releasably engage the next-to-bottom stud member and secure it against downward movement. The operation of the magazine in conjunction with the operation of the wall frame making apparatus will be described later, however, the operation of the stud magazine apparatus itself is as follows: With stop members 64 in the intercepting position of FIG. 6 and stop member 68 withdrawn, and the magazine loaded with the plurality of studs, cylinder 66 is operated to engage stop member 68 with the next-to-bottom stud, supporting it and the remaining stack of studs thereabove against downward movement. Cylinders 62 are then operated to withdraw the stop members 64, allowing the bottommost stud to fall downwardly out of the magazine while the stack of studs remains held in place by the stop members 68. After the bottommost stud has been discharged from the magazine, the cylinders 62 again operate to move the stop member 64 into intercepting position, whereupon cylinders 66 operate to release stop members 68, allowing the stack to fall onto stop member 64, and the foregoing cycle may then repeat with the remaining studs contained in the magazine.

If desired, the stud magazine may communicate with a stud charger (not shown) arranged to provide the magazine with a continuous supply of studs for continuous, uninterrupted operation. Such a stud charger could, of course, comprise a stud-forming apparatus similar to that which was described earlier in connection with the forming of the plate members from stock sheet metal at the infeed end of the wall frame making apparatus. In any case, a stud member, the previously described bottommost stud discharged from the stud magazine, is delivered to a stud carrying and positioning apparatus which will now be described.

The wall frame making apparatus of this invention includes means for receiving a stud member, inserting it between the spaced-apart plate members and positioning the stud perpendicularly relative to the plate members supported on the plate carriage with its ends engaged in the channels of the plate members for securing of the opposite ends of the stud member to the opposite plate members. In the embodiment illustrated, a stud carriage identified generally at 70, is operatively disposed on the frame and configured to move between an initial, angled position underlying the stud magazine for receiving a stud discharged therefrom, and a final position in which the stud carried thereby is positioned perpendicularly between the plate members at a stud-inserting and fastening station and there held in place while its ends are securely fastened to the opposite plate members.

Referring to FIGS. 2 and 6, the stud carriage 70 embodied herein is configured to receive and securely hold a stud, and therefore preferably mounts stud clamping assemblies 72, substantially similar to the previously described clamping assemblies 66, 68, to releasably secure a stud immovably in place on the carriage. The stud carriage is supported on the frame of the apparatus for a variety of movements necessary to the proper positioning and engagement of a stud with the opposite plate members for fastening.

Figure 5:
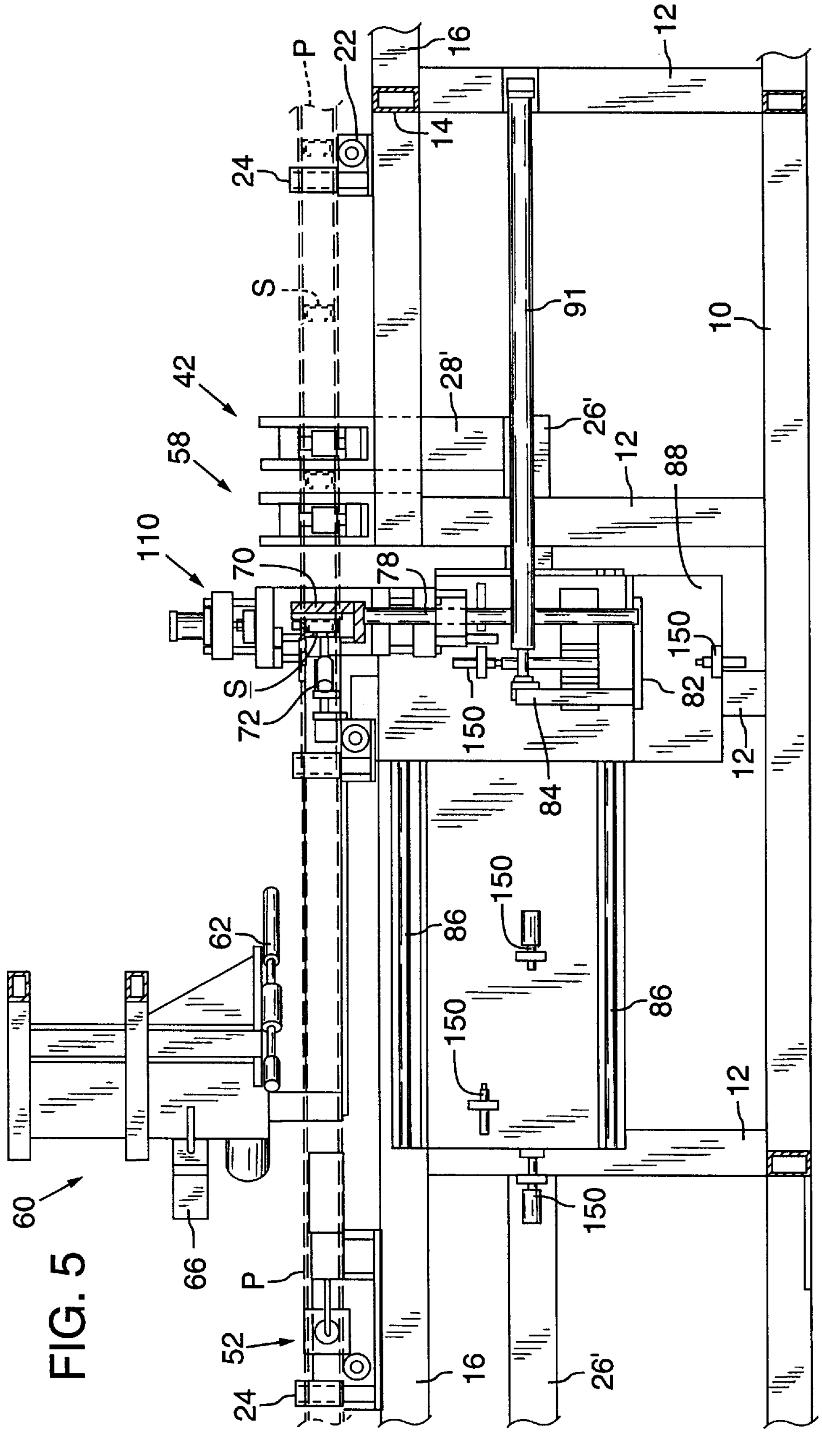
FIG. 5 is a fragmentary side elevation of the wall making apparatus taken along the line 5—5 in FIG. 2.

To accomplish this, the stud carriage includes a mounting assembly that is best understood by viewing FIGS. 4, 5 and 6 of the drawings. As seen in FIGS. 4 and 6, one side of the frame mounts a vertically extending pivot post 74 which pivotally supports a mounting plate 76. Secured on the mounting plate is a stud carriage elevator assembly comprising a vertically-movable carriage support post 78 slidably carried by bearings 80 mounted on the plate. The support post mounts the stud carriage at its upper end and is fixedly secured to an elevator base plate 82 at its bottom end. A hydraulic or pneumatic lift cylinder 84 is secured to the mounting plate 76 with its piston 84' secured to the elevator base plate 82, whereby operation of the cylinder 84 raises and lowers the stud carriage 70.

As seen in FIGS. 4 and 5, the opposite side of the frame mounts a pair of horizontally extending guide tracks 86 similar to the tracks 30 described earlier in connection with the reciprocating plate carriage. A mounting plate 88 is slidably mounted on the tracks 86 by bearing mounts 90, and is moved reciprocably on the tracks by suitable drive means such as the hydraulic or pneumatic piston cylinder 91 illustrated. The mounting plate 88 also mounts a stud carriage elevator assembly similar to the arrangement described in connection with the elevator assembly associated with the opposite end of the stud carriage.

From the foregoing it will be appreciated that, mounted thusly, the stud carriage is provided for reciprocation between its perpendicularly-extending position of FIG. 2 and a loading position underlying the angularly disposed stud magazine. Further, the stud carriage is also provided for vertical movement between raised and lowered positions.

In the case of wall frame constructions which utilize metal stud and plate configurations such as has been described and illustrated herein, the wall frame making apparatus of this invention preferably includes means for facilitating insertion of the terminal ends of the studs inside the channel of the opposite plate members for fastening of their respective flanges together. Two alternative embodiments of such a facilitating means are illustrated herein, and in that regard reference is made to FIGS. 4 and 7 of the drawings.

FIG. 4 shows the stud carriage 70 mounting a plate spreader means arranged to engage the spaced flanges P' of a plate member on the plate carriage to spread the flanges apart as the end of a stud member is inserted therebetween and into the channel of the plate. As shown, the plate spreader means comprises a pair of spaced apart, beveled wheels 92, (94, 94') mounted on a horizontally sliding arm 96 that is operated by a hydraulic, pneumatic or electric piston cylinder 98 to move the wheels into and out of engagement with the projecting flanges of the plate member. For purposes of illustration, the drawing shows a six inch wide plate member being engaged by wheels 92 and 94'. Were a 4 inch wide plate member being used, the plate flanges would be engaged by wheels 92 and 94.

Figure 7:
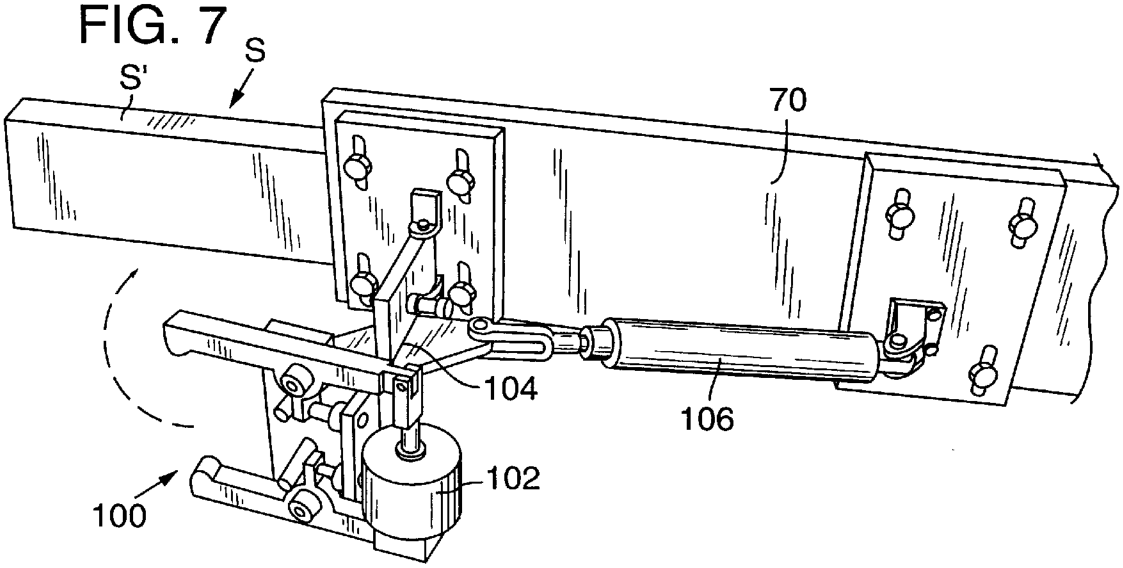
FIG. 7 is a fragmentary perspective view of one end of the stud carriage supporting a stud member and a stud clamping apparatus associated therewith.

FIG. 7 shows the stud carriage 70 supporting a stud member S and mounting a stud clamp means arranged to engage the space flanges S' of the stud member to squeeze the flanges toward each other as the end of the stud is inserted into the channel between the flanges P' of the plate member. In this embodiment, a clamp jaw assembly 100, operated by an appropriate drive means such as piston cylinder 102, is supported on an arm 104 which is pivotally mounted to the carriage 70. A piston cylinder 106, connected at one of its ends to the carriage and at its other end to the arm 104, is operated to move the assembly on its pivot mount into and out of operative position relative to the stud.

The basic operation of the stud carriage assembly thus described is as follows: With the stud carriage 70 in raised condition and disposed in an initial, loading position underlying the stud magazine 60, the bottommost stud is discharged from the magazine as has been earlier described, and is delivered by gravity to the underlying stud carriage 70. The stud carriage clamps 72 operate to engage the stud and secure it in place, whereupon the piston cylinder 92 is operated to move the associated mounting plate 88 on its supporting guide tracks 86, hence moving the corresponding end of the stud carriage longitudinally on the frame toward the outfeed end. The opposite end of the stud carriage, carried by mounting plate 76, pivots on its post mount 74 to the frame permiting the stud carriage to move into the perpendicularly-extending condition of FIG. 2 between the opposite plate members P supported on the plate carriage.

As will be recognized, the opposite plate members carried by the plate carriage and guide assemblies on the frame are maintained in a spaced apart condition equivalent to the finished wall height specified. Accordingly, when wood and similarly configured framing members P, S are used, the studs will be dimensioned so that they may be inserted between the plate members with their terminal ends in abutment with the confronting surface of the plate members when the stud extends perpendicularly therebetween, whereupon the members are secured together by suitable fastener means.

In the case of the metal frame member configurations illustrated, however, it is clear that the stud members must be longer in length than the distance between the projecting flanges P' of the channel-shaped plate members in order that the stud may extend into the channel so that the corresponding flanges of the stud and the plate members may be riveted or welded together, or fastened together as shown in FIG. 10. Thus the need to pivot the stud member from an angularly-disposed position into perpendicularly extending engagement with the plate members is most readily apparent in the illustrated embodiment.

It is to be understood here that the stud carriage position shown in FIG. 2 is defined by the perpendicular orientation of the stud member relative to the opposite plate members to which the former is to be attached. Securing means is provided on the frame for securing the opposite ends of the stud member to the top and bottom plate members P at the attachment point thus described.

The frame of the wall making apparatus of this invention mounts securing means associated with each of the opposite stud-inserting and fastening stations for securing the opposite ends of the stud members to the opposite plate members at desired, spaced apart intervals therealong each time the plate members are moved stepwise in the outfeed direction of the frame and the stud carriage operates to insert a stud in perpendicularly extending engagement with the plate members at said desired, spaced intervals. It is to be understood that, while the following description is directed to the particular embodiment of securing means illustrated in the drawings, other alternative types of securing means are contemplated for use with metal, wood and other types of wall frame material used in the construction industry.

Figure 9A:
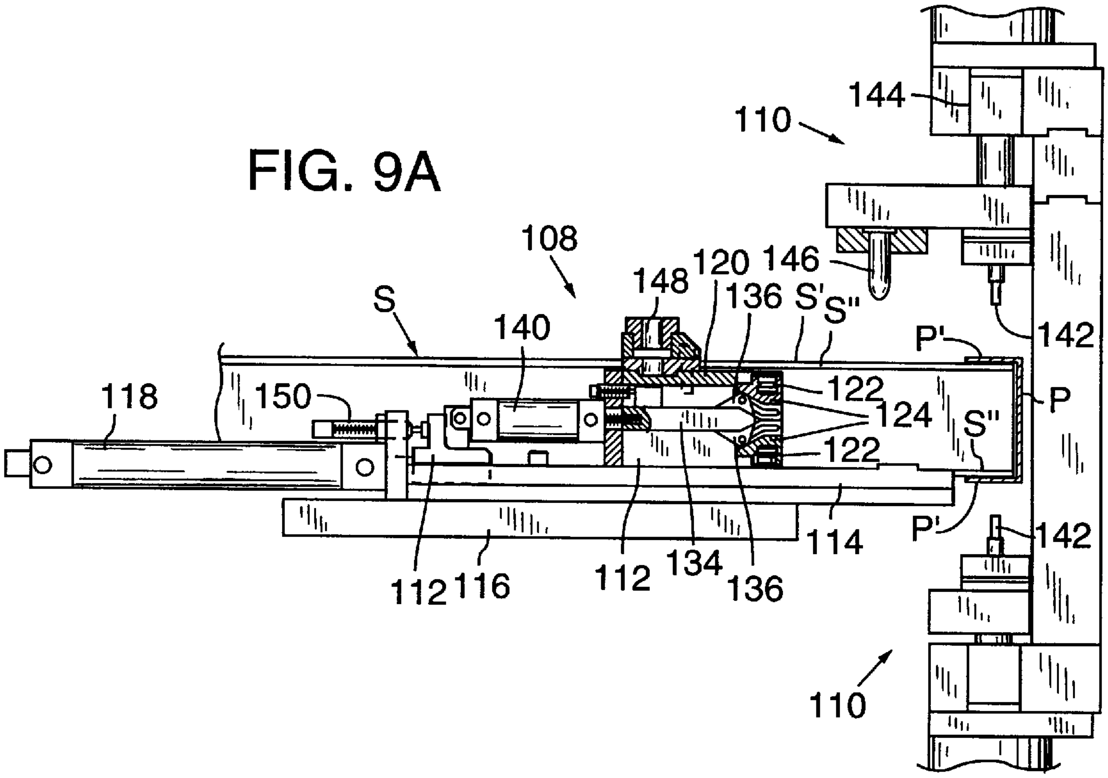
FIGS. 9A–9D are schematic side elevations illustrating the operational sequence of fastening apparatus shown in FIG. 8 in conjunction with the wall making apparatus of this invention.
Figure 9B:
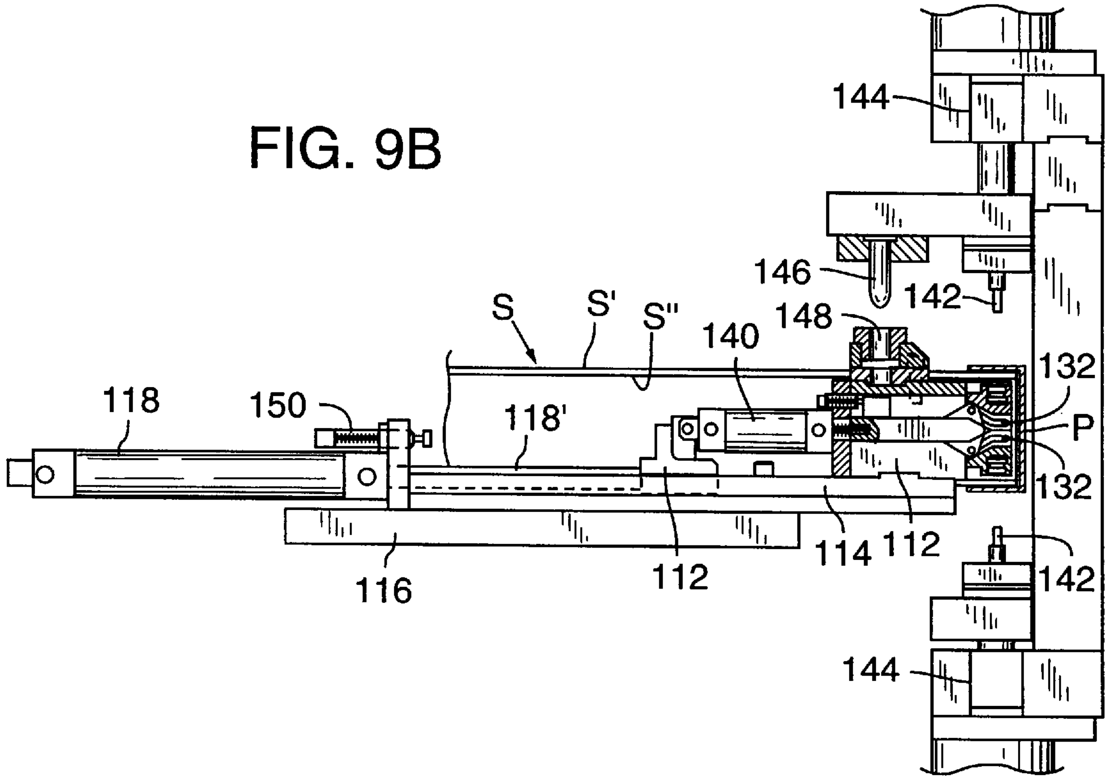
Figure 9C:
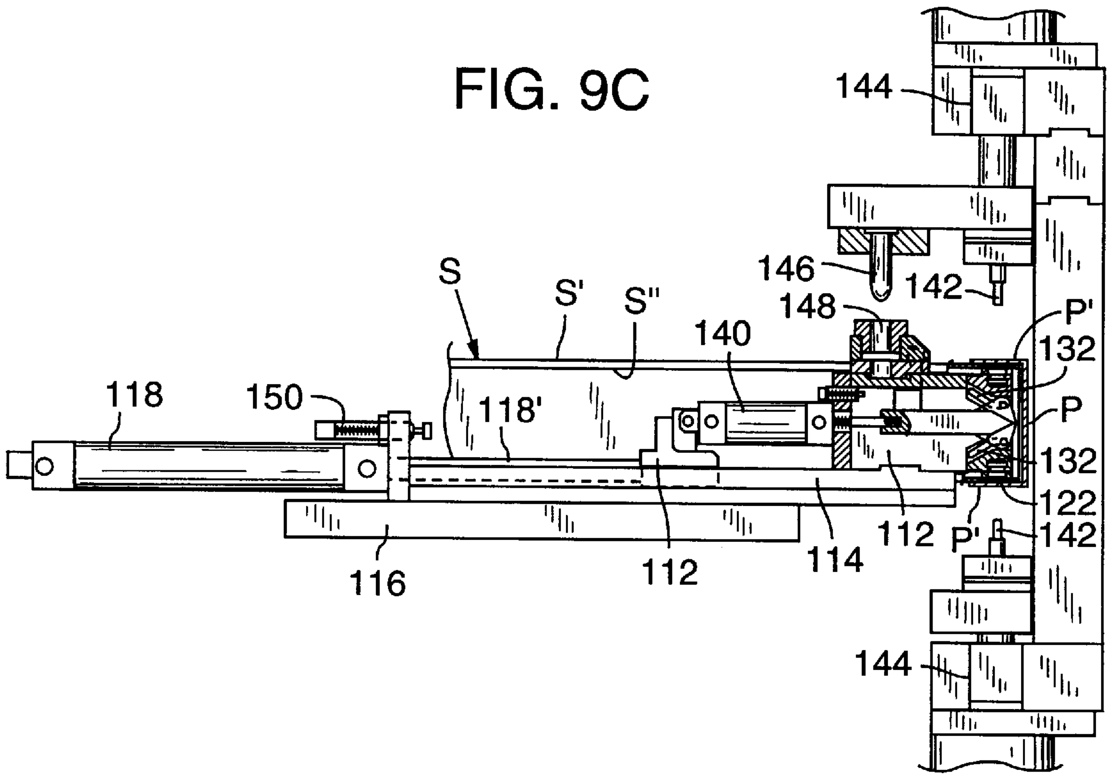
Figure 9D:
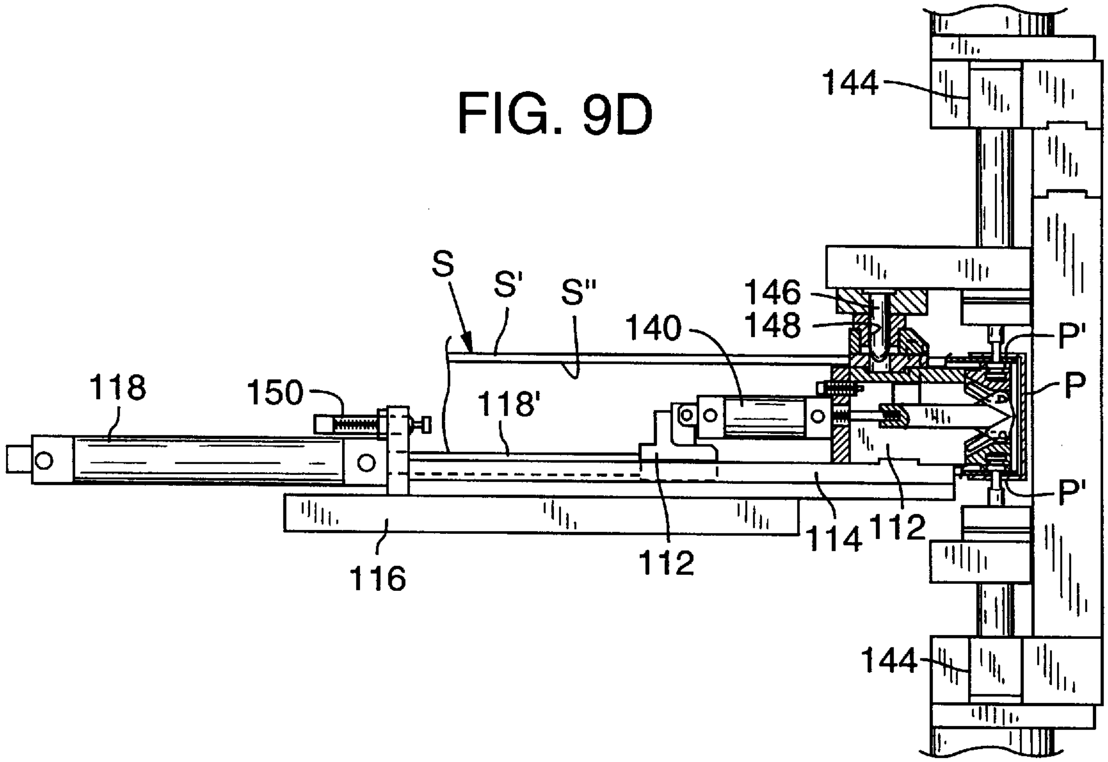
Figure 9E:
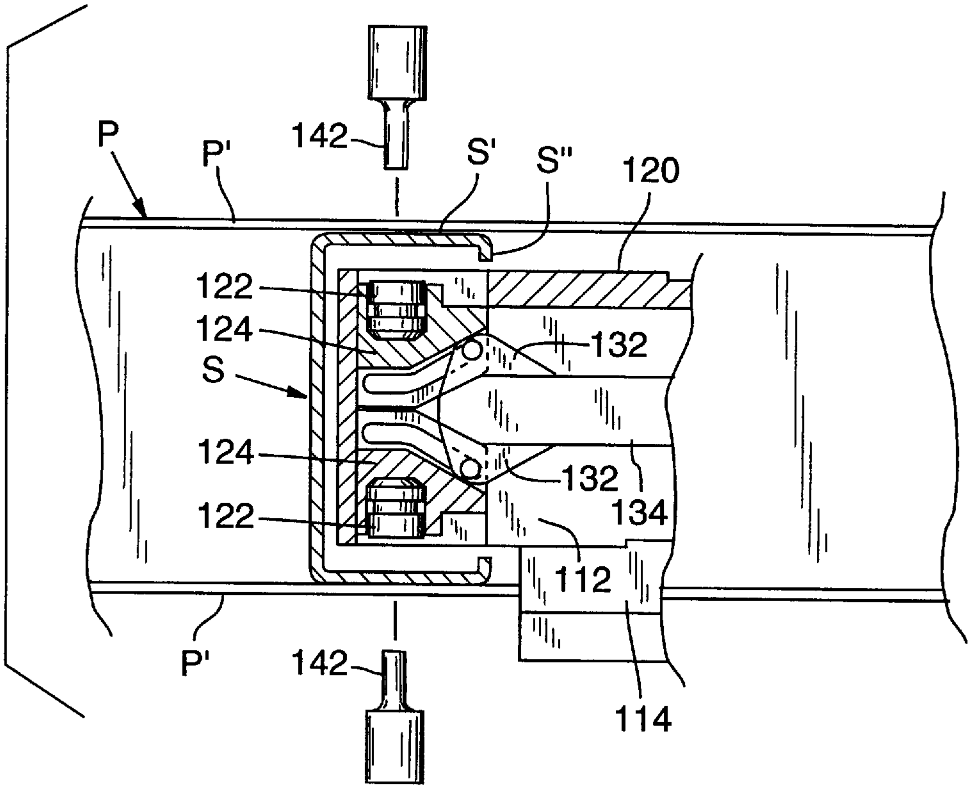
FIGS. 9E and 9F are fragmentary front elevations of the fastening apparatus shown in FIGS. 9A–9D but viewed through a stud member to more clearly illustrate the operational steps occurring in FIGS. 9B and 9C.

The securing means embodied herein comprises a first and second fastening apparatus associated with each fastening station, generally identified at 108, 110 respectively in FIGS. 2 and 9A–9F. The first fastening apparatus 108 is supported on a movable carriage 112 which is carried slidably on a guide track 114 mounted on a supporting base member 116 on the frame. Carriage drive means, embodied herein as hydraulic, pneumatic or electric cylinder 118 mounted on the base member 116, includes piston 118' which engages the carriage 112 to move it reciprocally on its guide track 114 between the retracted, non-operative position of FIG. 9A and the extended, fastening position as shown in FIGS. 9B–9D.

The first fastening apparatus is configured in this embodiment to provide opposing anvil means arranged to engage the inner surfaces of the flanges S' of the C-shaped stud member. Toward this end, the first fastening apparatus includes an anvil support means, illustrated herein as arm member 120 supported on movable carriage 112, and configured with a working end 120' arranged to be inserted into the interior space between the inturned flanges S" of a stud member and once therein, to position anvil members 122 into engagement with the inner surfaces of the stud member flanges S', as most clearly seen in FIGS. 9E and 9F. As seen best in FIG. 8, the working end 120' is configured to operably receive a pair of opposite anvil operating members 124 which are slidably retained in the working end of the arm member 120 by corresponding guide tabs 126 and guide slots 128 for movement toward and away from each other to retract and extend, respectively, the anvil members 122 within the confines of the stud member. The outwardly-facing ends of the anvil operating members 124 mount the anvil members 122 which operably engage the inner surfaces of the flanges of the stud members and are configured to provide a cooperating, confronting surface against which a pair of yet-to-be-described punch members may act to form a fastening connection which will be explained later.

As seen in FIG. 8, the confronting ends of the anvil operating members 124 each include a centrally disposed, longitudinally extending slot 130 and a pair of aligned, laterally-opposed, corresponding angular guide track slots 132. An elongated, longitudinally movable drive link member 134 is slidably carried within the anvil arm member 120 and configured for operable connection to the anvil operating members 124. In this regard, the drive link member 134 includes a pair of projecting tab members 136 which are freely received in the slots 130 and operably engage the anvil operating members 124 by means of connecting drive pins 138 extending through a bore (not shown) through each tab member for sliding reception of the opposite ends of the connecting drive pins in the corresponding, angled drive slots 132 on the anvil operating members. A hydraulic, pneumatic or electric cylinder 140 is connected to the drive link member 134 for moving the drive link member longitudinally in the direction toward and away from the working end 120' of the anvil arm member 120.

Connected thusly, it will be understood that operation of the cylinder 140 to move the drive link assembly longitudinally in the direction of the working end 120' of the anvil arm member (FIG. 9C to FIG. 9D and FIG. 9E to FIG. 9F), effectively moves the connecting pins 138 longitudinally along the angled drive slots 132 and, by virtue of the angled orientation of the drive slots, moves the anvil operating members 124 in their guide slots 128 away from each other. Operation of the cylinder 140 in the reverse direction of course positively draws the anvil operating members inwardly into retracted condition within the confines of the working end 120' anvil arm member. In this manner, the working end of the anvil arm member 120 may be inserted between the inwardly facing flanges S" and into the interior of the C-shaped stud member, whereupon the anvil members may then be moved outwardly into engagement with the inner surfaces of the side flanges S' of the stud member.

The cooperating, second fastening apparatus 110 (FIGS. 9A–9D) provides punch means arranged to move toward and into engagement with the outer surfaces of the flanges P' of the plate members for operable cooperation with the anvil members 122 engaging the inner surfaces of the flanges S' of the stud member, to indent and interengage the flanges of the plate and stud members in a fastening connection. In the embodiment illustrated in FIGS. 9A–9D, a pair of vertically-aligned, opposing punch members 142 are mounted on opposite piston cylinders 144 which are supported on the frame on opposite sides of a plate member P carried by the plates carriage C. It will be understood from FIGS. 9C and 9D that operation of the cylinders 144 moves the punch members toward and away from each other into and out of pressing, punching contact with the projecting flanges P' of a plate member disposed therebetween.

It will also be understood from FIGS. 9C and 9D that the punch members 142 are aligned with the extended anvil members 122 which engage and support the inner surface of the flanges S' of the stud member inserted into the channel of the plate member, and which provide an opposing base surface which supports the respective flanges S', P' of the stud and plate members during operation of the punch members. To assure proper alignment of the punch members 142 and the anvil members 122 during the punching operation, guide means, illustrated herein as projecting guide stud 146 on the second fastening apparatus 110 and corresponding guide sleeve 148 on the first fastening apparatus 108, are provided to interengage as the punch members are activated, and thereby assure consistent, proper alignment of the punch and anvil members during the fastening operation.

Figure 9F:
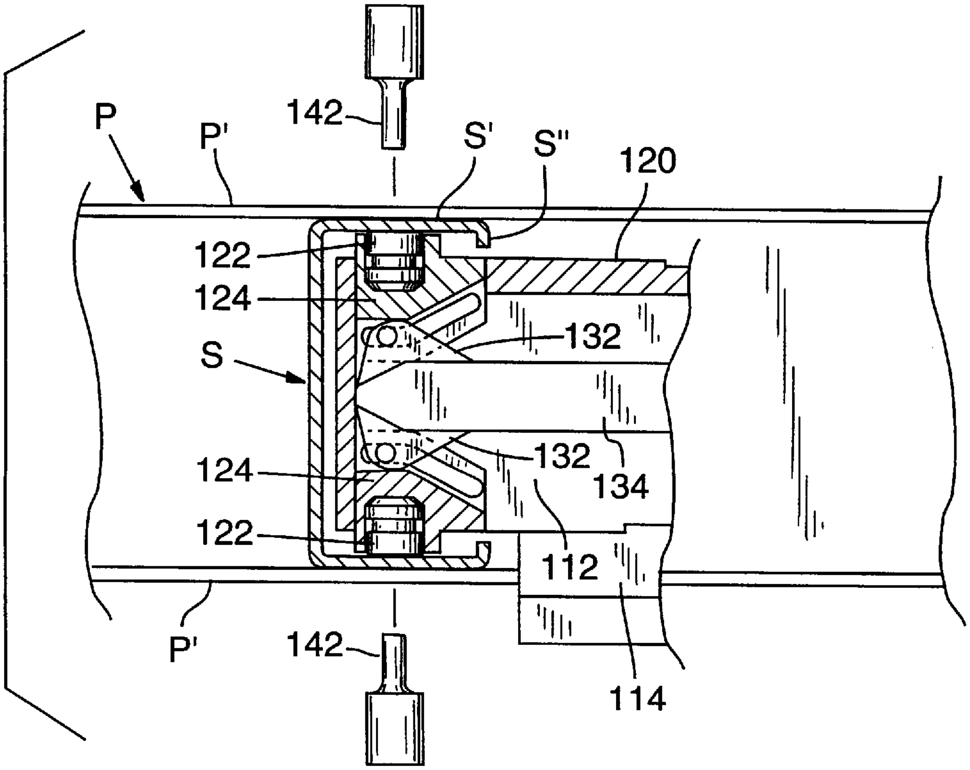

With regard now to the overall operation of the securing means thus described and the connection formed thereby, reference is made first to the operational sequence illustrated in FIGS. 9A–9D. FIG. 9A shows a plate member P having received a stud member S extending perpendicularly therefrom at a stud-inserting and fastening station disposed on one side of the wall frame making apparatus preliminary to operation of the fastening apparatus. FIG. 9B shows that the cylinder 118 is activated to move the carriage 112 mounting the first fastening apparatus 108 along its guide track 114 to insert the working end 120' of the anvil arm member 120 into position in the space between the projecting flanges S' of the stud member as also understood in FIG. 9E. FIGS. 9C and 9F show that cylinder 140 is then activated to move drive link 134 longitudinally, thereby moving the opposite anvil members 122 outwardly into extended condition engaging the inner surfaces of the opposite flanges S' of the stud member. FIG. 9D shows that cylinders 144 are then operated to move the punch members 142 toward each other, the guide members 146, 148 engaging each other as the punch members move, and thereby assure proper alignment of the punch members with the anvil members disposed within the confines of the stud and the plate members. Continued movement of the punch members into pressing contact with the outer surfaces of the plate members indents and interengagingly deforms the flanges between the punch members and the confronting anvil surfaces, as best illustrated in FIGS. 11A and 11B, and thereby fastens the plate and the stud flanges securely together. The foregoing operational sequence is then reversed to withdraw the securing means to its original position of FIG. 9A, whereupon the fastening cycle may then be repeated in conjunction with the securing of additional studs along the length of the plate members, as will become clear in the following description of the overall operation of the wall frame making apparatus of this invention.

With the individual operation of each of the various components of the wall frame making apparatus of this invention having been independently described in detail hereinbefore, the overall operation of the wall making apparatus embodied herein is as follows: With a pair of opposite plate members P disposed on the frame in laterally spaced apart positions, the plates carriage clamp assemblies 40, 42 are activated to secure the plate members P to the plates carriage C, whereupon the carriage drive cylinder 36 is activated to move the carriage in the outfeed direction of the frame a predetermined distance equivalent to the particular stud spacing distance desired in the resulting wall frame structure. The stationary, frame-mounted plate clamping assemblies 52, 58 are then activated to temporarily secure the plate members in position on the frame. The carriage clamping assemblies 40, 42 are activated to release the plate members and the carriage C is moved in the opposite direction toward the infeed end of the frame into its original position.

Either sequenced after the foregoing carriage operation or sequenced for concurrent operation therewith, the stud magazine apparatus 60 is operated as has been previously described to deliver its bottommost stud S to the stud carriage assembly 70 disposed in position underlying the outfeed end of the stud magazine. Alternatively, as has been described previously, stud forming means (not shown) may be provided in place of the stud magazine for delivery of individually formed studs directly to the carriage assembly when needed. Stud-securing clamping members 72 are activated to secure the stud in place on the stud carriage, and the stud carriage apparatus operated, as has been described earlier, to position the stud in perpendicular engagement with the opposite plate members for fastening of the opposite ends of the stud member to the opposite plate members.

In the case of the metal stud member and plate member configurations illustrated in the preferred embodiment, as the stud member is moved from its angularly oriented position between the opposite plate members to its final, perpendicularly-oriented position relative thereto, and prior to the terminal ends of the studs being moved into engagement with the plate members, the stud insertion-facilitating means, (plate flange-spreading rollers 92, 94, 94' and/or stud-squeezing clamp jaw apparatus 100), are activated to permit the opposite terminal ends of the stud member to move into the channels of the opposite plate members as the stud carriage is moved into its final position in which the stud member is oriented perpendicularly between the opposite plate members with its opposite terminal ends captured within the plate member channels.

With the plate members and stud member thus oriented and engaged, the first fastening apparatus 108 is operated to position the anvil members 122 against the inner surface of the stud flanges S' as previously described, after which the second fastening apparatus 110 is operated to move the punch members 142 against the outer surfaces of the flanges P' of the plate members.

After the fastening connection is made, the fastening apparatus is activated to withdraw to its original positions, and the stud carriage 70 is moved into its vertically lowered position in order to clear the now installed, spanning stud member, whereupon the stud carriage is operated to return to its initial, previously described position underlying the stud magazine. Thus positioned, the wall frame making apparatus is again in its original condition identified at the outset of this description of the operation of the apparatus, and the foregoing operation repeats to effect the placement and securing of successive stud members.

As indicated earlier, the apparatus of this invention and its operation may be, and preferably is, automatic and controlled by computer 38 as is typical and routine in production equipment. Toward this end, the wall frame making apparatus of this invention may include various sensors and limit switches 150 of any suitable type and arrangement as may be needed or indicated to signal and inform the computer for its proper control and operation of the various components of this apparatus.

From the foregoing it will be apparent to those skilled in the art that, while the particular embodiment shown and described hereinbefore is illustrative of a satisfactory, working arrangement of the invention as a whole, it is to be readily recognized that many changes other than those previously described may be made in the size, shape, type, number and arrangement of parts described hereinbefore without departing from the spirit of this invention and the scope of the appended claims. For example, in addition to the multitude of changes that may be made in the general structure of the apparatus and in the types and arrangements of the various components that have been discussed hereinbefore, the wall frame making apparatus of this invention may also be configured as a mobile unit if desired, carried on trailer or the bed of a truck for easy transport from construction site to construction site for immediate, on-site manufacture and delivery of complete, assembled wall frame structures.

Having thus described the method and apparatus of my invention, I claim:

1. Apparatus for making wall frame structures having top and bottom plate members and interconnecting stud members, the apparatus comprising:

a) an elongated frame having longitudinally opposite, infeed and outfeed ends, b) a plates carriage mounted on the frame for movement in a longitudinal direction of the frame, the plates carriage configured for receiving and moving opposite, laterally spaced apart, longitudinally extending, top plate members and bottom plate members longitudinally along the frame from the infeed end to the outfeed end thereof, c) drive means interengaging the frame and plates carriage for moving the plates carriage in an outfeed direction of the frame to move corresponding top and bottom plate members received by the plates carriage in stepwise increments in the outfeed direction along the frame, d) a stud carriage mounted on the frame for delivery and positioning a stud member perpendicularly between top and bottom plate members on the plates carriage, e) securing means on the frame for securing the opposite ends of the stud member to top and bottom plate members on the plates carriage, and f) control means for controlling the operation of said drive means and said stud carriage and said securing means for sequentially and repeatingly:

1) operating said drive means to move corresponding, laterally spaced, longitudinally extending top and bottom plate members stepwise in predetermined increments longitudinally along the frame in the outfeed direction thereof, and then, 2) operating said stud carriage to deliver and position a stud member between the top and bottom plate members, and then 3) operating said securing means to secure the opposite ends of the positioned stud member to the top and bottom plate members.

2. The apparatus of claim 1 wherein said plates carriage is mounted for reciprocal longitudinal movement on the frame and including plate clamp means on the plates carriage for releasably securing a plate member to the plates carriage during longitudinal movement of the plates carriage in the outfeed direction of the frame and releasing the plate member during reverse, reciprocal movement of the plates carriage in an infeed direction of the frame, and plate clamp means on the frame for releasably securing a plate member to the frame during said reverse, reciprocal movement of the plates carriage to prevent any movement of the plate members with the plates carriage reciprocal movement in the infeed direction of the frame.

3. The apparatus of claim 1 including a stud magazine on the frame for storing a plurality of stud members, the stud magazine extending across the frame and positioned for registry with the stud carriage for transferring a stud member from the magazine to the stud carriage.

4. The apparatus of claim 3 wherein the stud magazine stores a plurality of stud members in stacked condition, and including support means on the stud magazine for releasably supporting the bottommost stud member in the magazine preliminary to release and gravity delivery to the underlying registering stud carriage, and stop means on the stud magazine for releasably securing the next-to-bottom stud member against downward movement during delivery of the bottommost stud member to the stud carriage.

5. The apparatus of claim 1 wherein the stud carriage is mounted on the frame for pivotal movement across the frame between a position disposing a stud member inwardly of and at an oblique angle relative to plate members on the plates carriage and a position disposing the opposite ends of the stud member in engagement with and perpendicular to the plate members.

6. The apparatus of claim 5 including a stud magazine on the frame for storing a plurality of stud members, the stud magazine extending across the frame and positioned for registry with the stud carriage in the oblique disposition of the stud carriage for transferring a stud member from the magazine to the stud carriage.

7. The apparatus of claim 6 wherein the stud magazine stores a plurality of stud members in stacked condition, and including support means on the stud magazine for releasably supporting the bottommost stud member in the magazine preliminary to release and gravity delivery to the underlying registering stud carriage, and stop means on the stud magazine for releasably securing the next-to-bottom stud member against downward movement during delivery of the bottommost stud member to the stud carriage.

8. The apparatus of claim 5 wherein the plate members are channel shaped in cross section and the spaced flanges thereof face inwardly toward each other, and the stud member is arranged to extend inside the flanges of the plate members.

9. The apparatus of claim 8 including stud clamp means arranged to engage the spaced flanges of a stud member on the stud carriage and to squeeze said flanges toward each other, to facilitate insertion of said flanges inside the flanges of a plate member.

10. The apparatus of claim 8 including plate flange spreader means arranged to engage the spaced flanges of a plate member on the plate carriage and to spread said flanges apart, to facilitate insertion of the flanges of a stud member inside the flanges of the plate member.

11. The apparatus of claim 5 wherein the plate members are channel shape in cross section and the spaced flanges thereof face inwardly toward each other and the stud member is C-shape in cross section and the spaced flanges thereof are arranged to extend inside the flanges of the plate members with the inturned flange sections of the stud member facing each other, and the securing means comprises opposed anvil means arranged to engage the inner surfaces of the flanges of the stud member, anvil support means movable into the space between the inturned flange sections of a stud member and mounting the opposed anvil means for movement outwardly of the support means into engagement with the inner surfaces of the spaced flanges of the stud member, and punch means arranged to move toward and into engagement with the outer surfaces of the flanges of the plate members and in registry with the anvil means, to indent and interengage the flanges of the plate and stud members.

* * * * *